United States Patent [19]
Anderson et al.

[11] 3,918,871
[45] Nov. 11, 1975

[54] ARTICLE TRIMMING APPARATUS

[75] Inventors: Elmer L. Anderson, Corning;
Thomas F. Hillman, Bath, both of N.Y.

[73] Assignee: Corning Glass Works, Corning, N.Y.

[22] Filed: Nov. 22, 1974

[21] Appl. No.: 526,137

[52] U.S. Cl. .............................. 425/292; 425/388
[51] Int. Cl.² ..................... B29C 3/00; B29C 17/00
[58] Field of Search ............. 425/292, 388, DIG. 48

[56] References Cited
UNITED STATES PATENTS

| | | | |
|---|---|---|---|
| 3,041,669 | 7/1962 | Marshall et al. | 425/292 |
| 3,321,562 | 5/1967 | Wanderer | 425/DIG. 48 |

*Primary Examiner*—J. Howard Flint, Jr.
*Attorney, Agent, or Firm*—Charles W. Gregg; Burton R. Turner; Clarence R. Patty, Jr,

[57] ABSTRACT

Apparatus for trimming thermoplastic material surrounding the bordering edge of an article formed in a die or mold from a sheet of pliable thermoplastic material such as glass arranged over the die or mold, such apparatus including a trimmer having a lower cutting edge disposed above the die in vertical axial alignment with the center of the die and cooperative with a trimming edge of the die when the trimmer is lowered for trimming of the article formed in the die. The trimmer is locked against horizontal movement thereof at all times except when it closely approaches the die for a trimming operation and when it is performing such an operation at which times it is permitted to horizontally move or float for alignment with the die. A pressurized fluid cylinder and fluid flow control valves are provided for vertical actuation of the trimmer and a pressure accumulator bag controls the locking of the trimmer.

4 Claims, 1 Drawing Figure

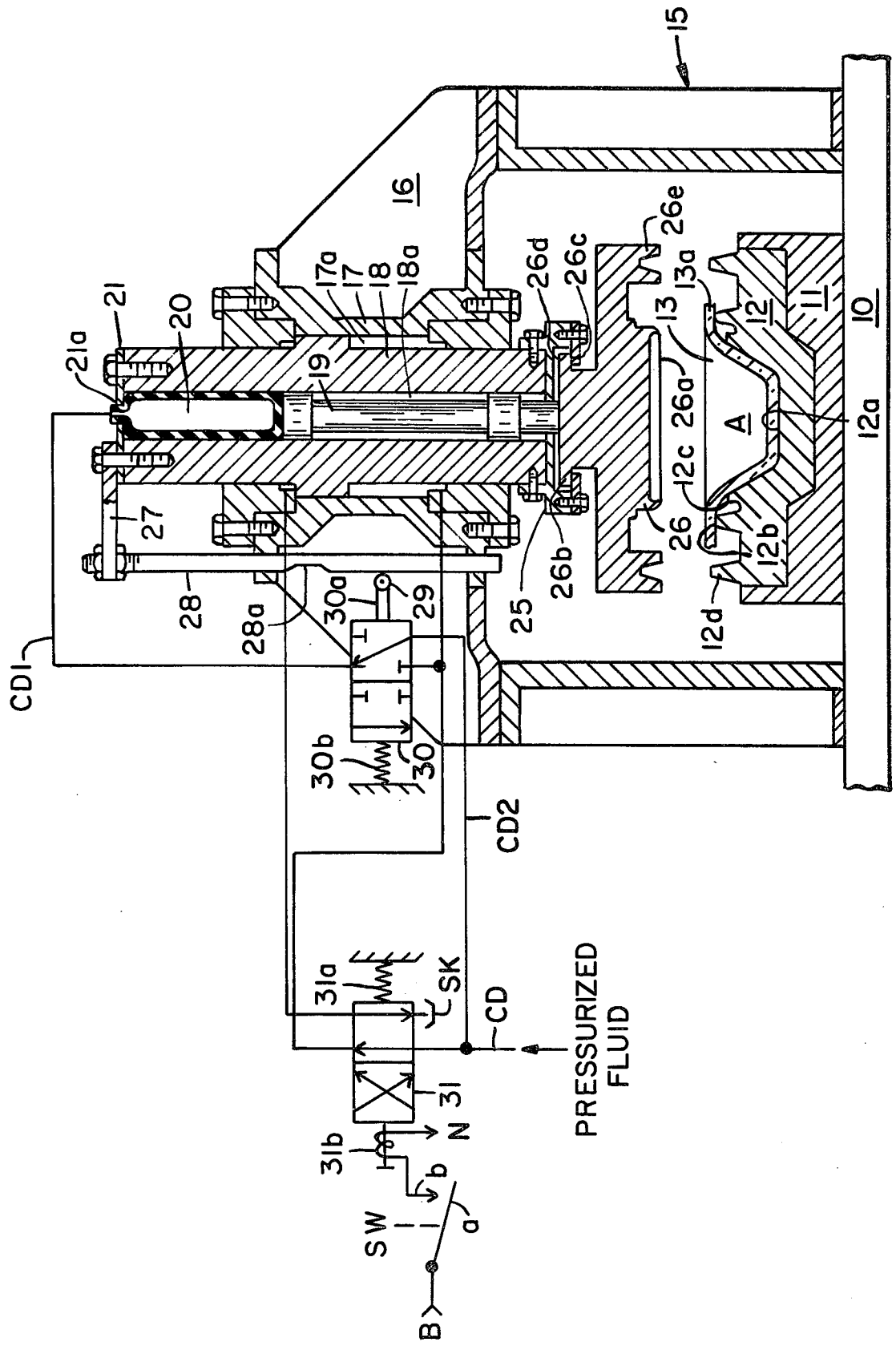

ARTICLE TRIMMING APPARATUS

BACKGROUND OF THE INVENTION

In the trimming of excess thermoplastic material such as a glass surrounding the bordering edges of articles formed in dies or molds from sheets of pliable thermoplastic material arranged over the respective dies or molds, there is sometimes employed a trimmer having a lower cutting edge cooperative with trimmer edges of the dies or molds. Such a trimmer is supported above a die or mold having an article formed therein as mentioned above, and the trimmer is lowered and raised, by its associated supporting apparatus, to and from trimming cooperation with the trimming edge of the die.

It has been found that considerable wear of a trimmer, such as that discussed above, and of apparatus associated therewith, occurs because the trimmer, during repeated actuations thereof, moves somewhat out of vertical alignment with the trimming edge of a die or dies with which the cutting edge of the trimmer is intended to cooperate. This is true when a trimmer is always actuated into cooperative relationship with the same die or mold but it is especially true when a trimmer is used with a succession of dies or molds sequentially moved into a position for trimming operations to be performed on articles such as that described. It is accordingly an object of the present invention to provide a novel trimming apparatus of the class mentioned, such apparatus having fewer parts subject to wear, and the trimmer of the apparatus being substantially self-aligning for reduction of wear.

It is another object of the present invention to provide a trimming apparatus including a vertically actuable trimmer which is normally locked against horizontal movement, that is, a trimmer which is locked against horizontal movement when it is in a position other than in close approach to a trimming operation or is performing a trimming operation in cooperation with a complimental trimming edge of a die or mold.

Other objects and characteristic features of the invention will become apparent as the description proceeds.

SUMMARY OF THE INVENTION

The invention is believed to be adequately summarized in the foregoing abstract of the disclosure and, therefore, to avoid repetition or redundancy, no summary of the invention will be given nor is any considered necessary.

BRIEF DESCRIPTION OF THE DRAWING

The single drawing FIGURE in the application comprises a cross-sectional elevational view of an article trimming appparatus in accordance with the invention and includes a schematic pressurized fluid flow control diagram of a control system for controlling the operations of the apparatus disclosed.

PREFERRED EMBODIMENT OF THE INVENTION

Referring to the single drawing FIGURE in detail, there is shown a table or platform 10 supporting on its upper surface a base support 11 for a mold or die 12 embodying a forming cavity 12a in which an article A has been formed from a hot pliable sheet 13 of a thermoplastic material such as glass which was positioned or arranged over cavity 12a and then sagged or forced, as by differential pressure, to conform to the contour of the cavity and form the article A of a desired configuration. The glass 13a beyond the bordering edge of the formed article A projects or lies over a rim or sheet supporting surface 12b of die 12 and the outer limits of such bordering edge are defined by a trimming edge 12c of die 12. The thermoplastic material 13a which is beyond and is surrounding such bordering edge is material which is to be trimmed from the formed article A. Mold 12 further includes a key or keying member 12d which preferably extends about die or mold 12 for mating cooperation with a complemental keyway member or channel member 26e provided on a thermoplastic material trimmer 26 to be hereinafter discussed.

There is also mounted on the upper surface of platform or table 10 a frame 15 including a crosshead 16 which straddles base support 11 and mold or die 12, and supports above such die a pressurized fluid cylinder 17 embodying in its bore 17a a first piston 18 whose upper and lower ends extend out of the corresponding ends of bore 17a of cylinder 17 and which piston 18, in turn, embodies a longitudinal bore 18a extending therethrough concentric with the bore 17a of cylinder 17, the axial centerlines of the bores of such cylinder and of piston 18 being generally in axial alignment with the center of die 12 normal thereto. A second piston 19 fits snugly but slidably in bore 18a of piston 18 with its lower end extending out of the lower end of such bore. Such second piston 19 is somewhat shorter than the length of bore 18a and a pressure accumulator bag 20 of a resilient material is disposed in such bore above second piston 19, such bag snugly fitting in the upper portion of the bore with its lower end adjacent or contacting the upper end of piston 19 and the upper end of the bag being generally even with the upper end of first piston 18. A retaining plate member 21 is attached to the upper end of piston 18 and covers the upper end of bore 18a to contain accumulator bag 20 snugly within such bore. Plate member 21 embodies a hole 21a extending therethrough for the purpose of connecting one end of a flexible pressurized fluid conduit CD1 to the upper end of accumulator bag 20 to supply pressurized fluid to the interior of such bag as hereinafter discussed.

The previously mentioned thermoplastic material trimmer 26 has a lower annular cutting edge 26a cooperative with the trimming edge 12c of die 12 and such trimmer is disposed between the lower end of cylinder 17 and the upper sheet supporting surface 12b of mold or die 12. The upper end of trimmer 26 is provided with a flange 26b which has a flat lower surface 26c. A trimmer support member 25 is attached to the lower end of first piston 18 and such support member extends downwardly and partly under said flat lower surface 26c of flange 26b of trimmer 26 to support such trimmer for limited movement in a plane paralleling trimming edge 12c of die 12, while the upper surface 26d of flange 26b of trimmer 26 is in contact with said lower end of the aforesaid second piston 19. When piston 18 in bore 17a of cylinder 17 is retracted within such cylinder as shown and in a manner hereinafter discussed, the lower cutting edge 26a of trimmer 26 is somewhat spaced from the trimming edge 12c of die 12. However, when piston 18 is actuated downwardly, as also hereinafter discussed, trimmer 26 is correspondingly moved downwardly and the previously mentioned complemental keyway member or channel member 26e provided on trimmer 26, and which is cooperative with said key or keying member 12d of mold 12, moves downwardly toward such key or keying member to subsequently accomplish said mating cooperation between the keying and channel members.

Referring further to the drawing, one end of an outwardly extending cam support arm 27 is attached to the upper end of piston 18 for upward and downward movement therewith. There is disposed in a hole in the second end of support arm 27 the upper end of a rod-shaped downwardly extending cam member 28 which embodies, in one side of the outer periphery thereof, a cut-out or recessed portion 28a into which extends a roller 29 rotatably held on the end of an actuating arm or plunger 30a of a first pressurized fluid flow control valve 30 which is normally spring biased to a first position by a compressible spring 30b and which is actuated to a second position against the force of said spring whenever said actuating arm or plunger 30a is pressed or pushed to the left (viewing the drawing) by cam member 28 moving upwardly. Cam member 28 is threaded on the upper end thereof and can be adjusted upwardly or downwardly in support arm 27 by adjustment of a pair of cooperative nuts screwed onto the threads of the cam member above and below support arm 27. Valve 30 is supported in any convenient manner in the position shown in the drawings, as by being attached to crosshead 16, and such valve controls a flow of pressurized fluid to and from pressure accumulator bag 20 as hereinafter described.

A second pressurized fluid flow control valve 31 is provided, such valve being an electrical solenoid actuated valve which is normally biased to a first position by a compressible spring 31a and is actuated to a second position by the energization of the solenoid winding 31b of such valve. Winding 31b is shown as having an energizing circuit which extends from a positive terminal B of a source of direct current suitable for energization of such valve and thence over contacts a-b of an electric switch SW in the circuit closed condition of the switch and through solenoid winding 31b to a negative terminal N of said current source. Said direct current source is not shown in the drawings for purposes of simplification thereof but such source may, for example, be a battery of a voltage and capacity suitable for the energization of winding 31b of valve 31. Switch SW may, for example, be actuated by a timing drum such as is well known in the art and which may be the same timing drum that controls the forming of an article such as A in the forming cavity 12a of die 12. Valve 31 may be located at any convenient location and such valve selectively controls a flow of pressurized fluid to and from the upper and lower ends of the bore of cylinder 17 for actuation of said first piston 18. Valve 31, at times, also controls flow of pressurized fluid to and from accumulator bag 20 as also hereinafter discussed.

Assuming that contacts a-b of switch SW are open, solenoid winding 31b of valve 31 is not then energized and spring 31a of such valve maintains the valve in the position shown in FIG. 1 so that pressurized fluid flows from a suitable source thereof over a conduit CD and through such valve to the lower end of bore 17a of cylinder 17. At such time the upper end of bore 17a of cylinder 17 is connected through valve 31 to a fluid sink SK. Said pressurized fluid, at such time, maintains piston 18 in bore 17a of cylinder 17 in a raised position in such bore as shown in FIG. 1. Cam member 28 is, at such time, pressing roller 29 to actuate arm or plunger 30a of valve 30 against the force of spring 30b and pressurized fluid flows, at such time, from conduit CD over another pressurized fluid conduit CD2 and through valve 30 to the aforesaid conduit CD1 and thence to accumulator bag 20 to cause such bag to expand and press against the upper end of piston 19 and, thereby, press the lower end of such piston into firm contact with the upper surface 26d of flange 26b of trimmer 26 to lock trimmer 26 against any movement thereof. The aforesaid source of pressurized fluid is omitted from the drawings for purposes of simplification thereof.

Assuming now that contacts a-b of switch SW are actuated closed to energize winding 31b of valve 31, such energization of such winding causes valve 31 to shift against the force of spring 31a to thereby supply pressurized fluid through such valve to the upper end of bore 17a of cylinder 17 while the lower end of such bore is connected through valve 31 to fluid sink SK. Piston 18 is thereby actuated downwardly in bore 17a of cylinder 17 for a trimming operation. During such downward actuation of piston 18, cam member 28 is also moved downwardly and roller 29 finally moves into the recess or cut-out 28a in cam member 28 so that arm 30a of valve 30 is no longer pushed or pressed to the left. Spring 30b of such valve member then actuates valve 30 so that accumulator bag 20 is connected through conduit CD1, and valves 30 and 31, to fluid sink SK. The pressure in accumulator bag 30 is thus released and the lower end of piston 19 is no longer pressed into firm contact with the upper surface 26d of flange 26b of trimmer 26 to lock such trimmer against movement thereof. The trimmer is then permitted to horizontally move to align itself so that the lower cutting edge 26a of the trimmer is disposed in cooperative alignment with trimming edge 12c of die 12 for performing said trimming operation as piston 18 continues its downward movement. Following said trimming operation, contacts a-b of switch SW are opened and valve 31 is returned by spring 31a to its position shown in the drawing to again supply pressurized fluid to the lower end of bore 17a of cylinder 17 for upward actuation of piston 18 while simultaneously supplying pressurized fluid through valve 30 and conduit CD1 to accumulator bag 20 for again locking trimmer 26 against movement thereof. As cam 28 moves upwardly roller 29 on arm 30a of valve 30 again moves out of recess 28a in cam 28 and valve 30 is again actuated to the left (viewing the drawing) so that pressurized fluid flows from said source thereof over conduit CD2 directly to valve 30 and through such valve and conduit CD1 to maintain a supply of pressurized fluid to accumulator bag 20 when valve 31 is again shifted to again actuate piston 18 downwardly. It will, therefore, be apparent that pressurized fluid is supplied to accumulator bag 20 at all times except when trimmer 26 is in close approach to a trimming operation or is performing such an operation.

It will be apparent that the movements described occur during each cycle of operation of the apparatus shown, that is, during each complete trimming cycle of the apparatus of the invention disclosed.

Although there is herein shown and described only a single form of apparatus embodying the invention disclosed, it will be understood that such is not intended to be in any way limiting but that various changes and modifications may be made therein within the purview of the appended claims without departing from the spirit and scope thereof.

We claim:

1. Apparatus for trimming thermoplastic material surrounding the bordering edge of an article formed in a die from a sheet of pliable thermoplastic material arranged over said die, such die having a trimming edge and such apparatus comprising, in combination;

I. a pressurized fluid cylinder embodying a first piston extending through the ends of such cylinder, such piston having a longitudinal bore extending therethrough concentric with the bore of said cylinder and such cylinder and piston being disposed above said die with the axial centerlines of the bores of the cylinder and piston generally in vertical axial alignment with the center of such die normal thereto;

II. a second piston fitting snugly slidable in said bore of said first piston with the lower end of such second piston extending out of the lower end of the bore of the first piston and such second piston being shorter than the length of the bore of the first piston;

III. a trimmer having a lower cutting edge cooperative with said trimming edge of said die for trimming said thermoplastic material and a flange on the upper end of such trimmer, such flange having a flat lower surface;

IV. a support member attached to the lower end of said first piston, such member extending downwardly and partly under said lower surface of said flange on said trimmer for supporting such trimmer for movement in a plane paralleling said trimming edge of said die and with the upper surface of said flange adjacent the lower end of said second piston;

V. a pressure accumulator bag of a resilient material disposed and fitting in the upper end of said bore in said first piston with its lower end adjacent the upper end of said second piston;

VI. means for alternately supplying pressurized fluid to the upper and lower ends of said cylinder for downward and upward actuations of said first piston respectively, such downward actuation of such piston moving said trimming and cutting edges into cooperative relationship with each other for trimming said thermoplastic material surrounding said bordering edge of said article; and VII. means for controlling a supply of pressurized fluid to said accumulator bag to actuate said second piston downwardly and the lower end of such piston into firm contact with said upper surface of said flange on said trimmer for locking thereof against said movement in said plane at times other than when said cutting edge is closely approaching and thereafter reaches said cooperative relationship with said trimming edge for trimming said thermoplastic material.

2. Apparatus in accordance with claim 1 and in which said means for controlling a supply of pressurized fluid to said accumulator bag includes a fluid flow control valve and a cam for actuation of such control valve, such cam being actuated by said downward and upward actuations of said first piston.

3. Apparatus for trimming thermoplastic material surrounding the bordering edge of an article formed in a die from a sheet of pliable thermoplastic material arranged over said die, such die having a trimming edge and such apparatus comprising, in combination;

I. a pressurized fluid cylinder embodying a first piston extending through the ends of such cylinder, such piston having a longitudinal bore extending therethrough concentric with the bore of said cylinder and such cylinder and piston being disposed above said die with the axial centerlines of the bores of the cylinder and piston generally in vertical axial alignment with the center of such die normal thereto;

II. a second piston fitting snugly slidable in said bore of said first piston with the lower end of such second piston extending out of the lower end of the bore of the first piston and such second piston being shorter than the length of the bore of the first piston;

III. a trimmer having a lower cutting edge cooperative with said trimming edge of said die for trimming said thermoplastic material and a flange on the upper end of the trimmer, such flange having a flat lower surface;

IV. a support member attached to the lower end of said first piston, such member extending downwardly and partly under said lower surface of said flange on said trimmer for supporting such trimmer for movement in a plane paralleling said trimming edge of said die and with the upper surface of said flange adjacent the lower end of said second piston;

V. a pressure accumulator bag of a resilient material disposed and fitting in the upper end of said bore in said first piston with its lower end adjacent the upper end of said second piston;

VI. means for alternately supplying pressurized fluid to the upper and lower ends of said cylinder for downward and upward actuations of said first piston respectively, such downward actuation of such piston moving said trimming and cutting edges into cooperative relationship with each other for trimming said thermoplastic material surrounding said bordering edge of said article; and VII. means for normally supplying pressurized fluid to said accumulator bag to actuate said second piston to move its lower end into firm contact with said upper surface of said flange on said trimmer to lock such trimmer against said movement in said plane and for releasing said fluid when said cutting edge closely approaches said die, such fluid thereafter remaining released only until the start of said upward actuation of said first piston.

4. Apparatus in accordance with claim 3 and in which said means for supplying pressurized fluid to said accumulator bag includes a fluid flow control valve and a cam for actuation of such control valve, such cam being actuated by said downward and upward actuations of said first piston.

* * * * *